US006949300B2

(12) United States Patent
Gillispie et al.

(10) Patent No.: US 6,949,300 B2
(45) Date of Patent: Sep. 27, 2005

(54) PRODUCT AND METHOD OF BRAZING USING KINETIC SPRAYED COATINGS

(75) Inventors: Bryan A. Gillispie, Warren, MI (US); Zhibo Zhao, Ann Arbor, MI (US); John Robert Smith, Birmingham, MI (US); Thomas Hubert Van Steenkiste, Ray, MI (US); Alaa A. Elmoursi, Troy, MI (US); Yang Luo, East Amherst, NY (US); Hartley F. Hutchins, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/418,244

(22) Filed: Apr. 16, 2003

(65) Prior Publication Data

US 2003/0207148 A1 Nov. 6, 2003

Related U.S. Application Data

(63) Continuation of application No. 09/930,405, filed on Aug. 15, 2001, now abandoned.

(51) Int. Cl.[7] .......................... B32B 15/01; B05D 1/02

(52) U.S. Cl. ................... 428/654; 148/516; 427/180; 427/189; 427/191; 427/192; 427/201; 427/202; 427/203; 427/205; 427/310; 427/406; 428/546; 428/548; 428/553; 428/557; 428/615; 428/636; 428/650; 428/658; 428/937; 428/940

(58) Field of Search .................. 428/654, 650, 428/615, 636, 658, 546, 548, 553, 557, 937, 940; 427/180, 189, 191, 192, 201, 202, 203, 205, 310, 406; 148/516, 519, 521, 535; 75/255; 29/458; 118/308, 310, 311

(56) References Cited

U.S. PATENT DOCUMENTS

| 2,861,900 | A | 11/1958 | Smith et al. |
|---|---|---|---|
| 3,100,724 | A | 8/1963 | Rocheville |
| 3,876,456 | A | 4/1975 | Ford et al. |
| 3,993,411 | A | 11/1976 | Babcock et al. |
| 3,996,398 | A | 12/1976 | Manfredi |

(Continued)

FOREIGN PATENT DOCUMENTS

| DE | 42 36 911 | 12/1993 |
|---|---|---|
| DE | 199 59 515 | 6/2001 |
| DE | 100 37 212 | 1/2002 |
| DE | 101 26 100 | 12/2002 |
| EP | 1 160 348 | 12/2001 |

(Continued)

OTHER PUBLICATIONS

"Kinetic Spray Coatings," Van Steenkiste et al., Surface and Coatings Technology, vol. 111, Issue 1, pp. 62–71, Jan. 10, 1999.*

Alkhimov, et al; *A Method of "Cold" Gas–Dynamic Deposition*; Sov. Phys. Kokl. 36(12; Dec. 1990; pp. 1047–1049.

Dykuizen et al; *Impact of High Velocity Cold Spray Particles*; in Journal of Thermal Spray Technology 8(d); 1999; pp. 559–564, no month given.

Swartz, et al; *Thermal Resistance At Interfaces; Appl. Phys. Lett.*, vol. 51, No. 26,28: Dec. 1987; pp. 2201–2202.

(Continued)

*Primary Examiner*—Robert R. Koehler
(74) *Attorney, Agent, or Firm*—Scott A. McBain

(57) ABSTRACT

The present invention is directed to a process for preparing aluminum and aluminum alloy surfaces in heat exchangers for brazing by depositing thereon a kinetic sprayed brazing composition. The process simultaneously deposits monolith or composite coatings that can include all braze materials and corrosion protection materials used in the brazing of aluminum fins to plates and tubes in a single stage.

13 Claims, 13 Drawing Sheets

U.S. PATENT DOCUMENTS

| | | |
|---|---|---|
| 4,263,335 A | 4/1981 | Wagner et al. |
| 4,416,421 A | 11/1983 | Browning |
| 4,606,495 A | 8/1986 | Stewart, Jr. et al. |
| 4,891,275 A | 1/1990 | Knoll |
| 4,939,022 A | 7/1990 | Palanisamy |
| 5,187,021 A | 2/1993 | Vydra et al. |
| 5,217,746 A | 6/1993 | Lenling et al. |
| 5,271,965 A | 12/1993 | Browning |
| 5,302,414 A * | 4/1994 | Alkhimov et al. .......... 427/192 |
| 5,308,463 A | 5/1994 | Hoffmann et al. |
| 5,328,751 A | 7/1994 | Komorita et al. |
| 5,340,015 A | 8/1994 | Hira et al. |
| 5,362,523 A | 11/1994 | Gorynin et al. |
| 5,395,679 A | 3/1995 | Myers et al. |
| 5,424,101 A | 6/1995 | Atkins et al. |
| 5,464,146 A | 11/1995 | Zaluzec et al. |
| 5,465,627 A | 11/1995 | Garshelis |
| 5,476,725 A | 12/1995 | Papich et al. |
| 5,493,921 A | 2/1996 | Alasafi |
| 5,520,059 A | 5/1996 | Garshelis |
| 5,525,570 A | 6/1996 | Chakraborty et al. |
| 5,527,627 A | 6/1996 | Lautzenhiser et al. |
| 5,585,574 A | 12/1996 | Sugihara et al. |
| 5,593,740 A | 1/1997 | Strumban et al. |
| 5,648,123 A | 7/1997 | Kuhn et al. |
| 5,683,615 A | 11/1997 | Munoz |
| 5,706,572 A | 1/1998 | Garshelis |
| 5,708,216 A | 1/1998 | Garshelis |
| 5,725,023 A | 3/1998 | Padula |
| 5,795,626 A | 8/1998 | Gabel et al. |
| 5,854,966 A | 12/1998 | Kampe et al. |
| 5,875,626 A | 3/1999 | Cromartie |
| 5,887,335 A | 3/1999 | Garshells |
| 5,889,215 A | 3/1999 | Kilmartin et al. |
| 5,894,054 A | 4/1999 | Paruchuri et al. |
| 5,907,105 A | 5/1999 | Pinkerton |
| 5,907,761 A * | 5/1999 | Tohma et al. ................ 428/553 |
| 5,952,056 A | 9/1999 | Jordan et al. |
| 5,965,193 A | 10/1999 | Ning et al. |
| 5,989,310 A | 11/1999 | Chu et al. |
| 5,993,565 A | 11/1999 | Pinkerton |
| 6,033,622 A | 3/2000 | Maruyama |
| 6,047,605 A | 4/2000 | Garshelis |
| 6,051,045 A | 4/2000 | Narula et al. |
| 6,051,277 A | 4/2000 | Claussen et al. |
| 6,074,737 A | 6/2000 | Jordan et al. |
| 6,098,741 A | 8/2000 | Gluf, Jr. et al. |
| 6,119,667 A | 9/2000 | Boyer et al. |
| 6,129,948 A | 10/2000 | Plummer et al. |
| 6,139,913 A * | 10/2000 | Van Steenkiste et al. ... 427/191 |
| 6,145,387 A | 11/2000 | Garshelis |
| 6,149,736 A | 11/2000 | Sugihara et al. |
| 6,159,430 A | 12/2000 | Foster |
| 6,189,663 B1 | 2/2001 | Smith et al. |
| 6,260,423 B1 | 7/2001 | Garshelis |
| 6,261,703 B1 | 7/2001 | Sasaki et al. |
| 6,283,386 B1 | 9/2001 | Van Steenkiste et al. |
| 6,283,859 B1 | 9/2001 | Carlson et al. |
| 6,289,748 B1 | 9/2001 | Lin et al. |
| 6,338,827 B1 | 1/2002 | Nelson et al. |
| 6,344,237 B1 | 2/2002 | Kilmer et al. |
| 6,374,664 B1 | 4/2002 | Bauer et al. |
| 6,402,050 B1 | 6/2002 | Kashirin et al. |
| 6,422,360 B1 | 7/2002 | Oliver et al. |
| 6,424,896 B1 | 7/2002 | Lin |
| 6,442,039 B1 | 8/2002 | Schreiber |
| 6,446,857 B1 | 9/2002 | Kent et al. |
| 6,465,039 B1 | 10/2002 | Pinkerton et al. |
| 6,485,852 B1 | 11/2002 | Miller et al. |
| 6,488,115 B1 | 12/2002 | Ozsoylu et al. |
| 6,490,934 B2 | 12/2002 | Garshelis |
| 6,511,135 B2 | 1/2003 | Ballinger et al. |
| 6,537,507 B2 | 3/2003 | Nelson et al. |
| 6,551,734 B1 | 4/2003 | Simpkins et al. |
| 6,553,847 B2 | 4/2003 | Garshelis |
| 6,615,488 B2 | 9/2003 | Anders |
| 6,623,704 B1 | 9/2003 | Roth |
| 6,623,796 B1 | 9/2003 | Van Steenkiste |
| 6,624,113 B2 | 9/2003 | LaBarge et al. |
| 2002/0071906 A1 | 6/2002 | Rusch |
| 2002/0073982 A1 | 6/2002 | Shaikh et al. |
| 2002/0102360 A1 | 8/2002 | Subramanian et al. |
| 2002/0110682 A1 | 8/2002 | Brogan |
| 2002/0112549 A1 | 8/2002 | Cheshmehdoost et al. |
| 2002/0182331 A1 | 12/2002 | Leonardi et al. |
| 2003/0039856 A1 | 2/2003 | Gillispie et al. |
| 2003/0190414 A1 | 10/2003 | VanSteenksite |
| 2003/0219542 A1 | 11/2003 | Ewasyshyn et al. |

FOREIGN PATENT DOCUMENTS

| | | |
|---|---|---|
| EP | 1245854 A2 | 2/2002 |
| JP | 55031161 | 3/1980 |
| JP | 61249541 | 11/1986 |
| JP | 04180770 | 6/1992 |
| JP | 04243524 | 8/1992 |
| WO | 98/22639 | 5/1998 |
| WO | 02/052064 | 1/2002 |
| WO | 03009934 | 2/2003 |

OTHER PUBLICATIONS

Davis, et al; *Thermal Conductivity of Metal–Matrix Composlites; J. Appl. Phys.* 77 (10), May 15, 1995; pp. 4954–4960.

Stoner et al; *Measurements of the Kapitza Conductance between Diamond and Several Metals*; Physical Review Letters, vol. 68, No. 10; Mar. 9, 1992; pp. 1563–1566.

Stoner et al; *Kapitza conductance and heat flow between solids at temperatures from 50 to 300K*; Physical Review B, vol. 48, No. 22, Dec. 1, 1993–11; pp. 16374;16387.

Johnson et al. *Diamond/AL metal matrix composites formed by the presureless metal infiltration process*; J. Maier, Res., vol. 8, No. 5, May 1993, pp. 11691173.

Rajan et al; *Reinforcement coatings and interfaces in Aluminium Metal Matrix Composites*; pp. 3491–3503, (o date.

*LEC Manufacturing Engineering Capabilities*; Lanxide Electronic Components, Inc., no date.

Dykhuizen et al; *Gas Dynamic Principles of Cold Spray*; Journal of Thermal Spray Technology; Jun. 1998; pp. 205–212.

McCune et al; *An Exploration of the Cold Gas–Dynamic Spray Method For Several Materials Systems*; no date.

Ibrahim et al; *Particulate Reinforced Metal Matrix Composites—A Review*; Journal of Materials Science 26; pp. 1137–1156, no date.

Van Steckiste, et al; *Kinetic Spray Coatings*; in Surface & Coatings Technology III; 1999; pp. 62–71, no month given.

Liu et al *Recent Development in the Fabrication of Metal Matrix–Particulate Composites Using Powder Metallurgy Techniques*; in Journal of Material Science 29; 1994; pp. 1999–2007; National University of Singapore, Japan, no month given.

Papyria; *The Cold Gas–Dynamic Spraying Method a New Method for Coatings Deposition Promises a New Generation of Technologies*; Novosibirsk, Russia, no date.

McCune, et al; *Characterization of Copper and Steel Coatings Made by the Cold Gas–Dynamic Spray Method*; National Thermal Spray Conference, no date.

European Search Reoprt dated Jan. 29, 2004 and it's Annex.

I.J. Garshelis et al; *A Magnetoelastic Torque Transducer Utilizing a Ring Divided into Two Oppositely Polarized Circumferential Regions*; MMM 1995; Paper No. BB–08, no month given.

I.J. Garshelis et al; *Development of a Non–Contact Torque Transducer for Electric Power Steering Systems*; SAE Paper No. 920707; 1992; pp. 173–182, no month given.

Boley et al; *The Effects of Heat Treatment on the Magnetic Behavior of Ring—Type Magnetoelastic Torque Sensors*; Proceedings of Sicon '01; Nov. 2001.

J.E. Snyder, et al; *Low Coercivity Magnetostrictive Material with Giant Piezomagnetic d33*, Abstract Submitted for the MAR99 Meeting of the American Physical Society, (submitted on Nov. 13, 1998).

McCune, et al; *An Exploration of the Cold Gas–Dynamic Spray Method* . . . ; Proc. Nat. Thermal Spray Conf. ASM Sep. 1995.

Pavel Ripka, et al; *Pulse Excitation of Micro–Fluxgate Sensors*, IEEE Transactions on Magnetics, vol. 37, No. 4, Jul. 2001, pp. 1998–2000.

Trifon M. Liakopoulos, et al; *Ultrahigh Resolution DC Magnetic Field Measurements Using Microfabricated Fluxgate Sensor Chips*, University of Cininnati, Ohio, Center for Microelectronic Sensors and MEMS, Dept. of ECECS pp. 630–631, no date.

Derac Son, *A New Type of Fluxgate Magnetometer Using Apparent Coercive Field Strength Measurement*, IEEE Transactions on Magnetics, vol. 25, No. 5, Sep. 1989, pp. 3420–3422.

O. Dezauri, et al; *Printed Circuit Board Integrated Fluxgate Sensor*, Elsevier Science S. A. (2000) Sensors and Actuators, pp. 200–203, no month given.

How, et al; *Generation of High–Order Harmonics in Insulator Magnetic Fluxgate Sensor Cores*, IEEE Transactions on Magnetics, vol. 37, No. 4, Jul. 2001, pp. 2448–2450.

Moreland, *Fluxgate Magnetometer*, Carl W. Moreland, 1999–2002, pp. 1–9.

Ripka, et al; *Symmetrical Core Improves Micro–Fluxgate Sensors*, Sensors and Actuators, Version 1, Aug. 25, 2000, pp. 1–9.

Horton How, et al; *Development of High–Sensitivity Fluxgate Magnetometer Using Single–Crystal Yttrium Iron Garnet Thick Film as the Core Material, ElectroMagnnetic Applications*, Inc., no date.

Ripka, et al; *Microfluxgate Sensor with Closed Core*, submitted for the Sensors and Actuators, Version 1, Jun. 17, 2000.

Henriksen, et al; *Digital Detection and Feedback Fluxgate Magnetometer*, Meas. Sci. Technol. 7 (1996) pp. 897–903, no month given.

Cetek 930580 Compass Sensor, *Specifications*, Jun. 1997.

Geyger, *Basic Principles Characteristics and Applications*, Magnetic Amplifier Circuits, 1954, pp. 219–232.

\* cited by examiner

US 6,949,300 B2

PRODUCT AND METHOD OF BRAZING USING KINETIC SPRAYED COATINGS

This is a continuation of application Ser. No. 09/930,405 filed on Aug. 15, 2001.

TECHNICAL FIELD

The present invention is directed to a process for preparing aluminum and aluminum alloy and other metal tubes, plates and other components used in heat exchangers such as condensers, radiators and evaporators for brazing by depositing thereon a kinetic sprayed brazing composition. The single-step process deposits monolith or composite coatings that may comprise one or more brazing materials such as a corrosion protector, a brazing filler and a brazing flux.

INCORPORATION BY REFERENCE

U.S. Pat. No. 6,139,913, entitled "Kinetic Spray Coating Method and Apparatus" is incorporated by reference herein.

BACKGROUND OF THE INVENTION

Heat exchangers such as condensers, radiators, evaporators, heater cores and coolers made of aluminum or aluminum alloy (generally referred to hereinafter as "aluminum") or other metals are widely used today. These heat exchangers generally include perforated fins brazed to the external surfaces of tubes and plates that form the structure of the heat exchanger. The tubes are usually extruded and the fins are usually made from sheets.

Prior to assembly into heat exchangers the tubes and plates are typically coated (or plated) with a corrosion protector using known techniques such as twin-wire arc thermal spraying. Zinc or zinc-aluminum alloys are generally used as the corrosion protector, but any known corrosion inhibitor may be used. The fins are prepared prior to assembly to carry the brazing filler that fills the joints between the tube and fins during brazing. The brazing filler is applied to fin sheet stock as a cladding layer in the form of an overlaid sheet that is rolled and bonded onto the aluminum fin sheet. The cladding consists of a material or materials known in the art to be capable of melting at a temperature lower than the heat exchanger aluminum such as an aluminum-silicon alloy so that, during brazing, the cladding will form brazed joints. The use of such clad brazing sheets is well known and commonly used, even though it is well known that the use of clad brazing sheets adds to production costs and accelerates tool wear.

Prior to brazing of aluminum heat exchangers, tube cladding and plate surfaces must be cleaned and de-oxidized. Removal of the oxidation layer is necessary in order to form strong joints. This is generally accomplished using a material commonly known as flux that chemically cleans and de-oxidizes the surface and protects the aluminum from further oxidation. The flux is applied to the aluminum surfaces of plates and tubes prior to brazing using techniques such as flux showering or electrostatic spraying. During brazing, the flux material further serves to reduce the filler metal's surface tension and promote wetting of the materials to assist in joint formation. While many flux materials are known and used, Nocolok® Flux (a mixture of potassium fluoroaluminate salts manufactured by Solvay Fluor), and similarly formulated fluxes, are preferred due to their non-corrosive effect on aluminum after brazing. The components of the heat exchanger are finally joined together by bringing the assembly to brazing temperature in a controlled atmosphere brazing furnace, a vacuum furnace, or the like.

To summarize, aluminum heat exchangers for automotive vehicles and other applications, today, are manufactured by flux brazing of filler-clad fin sheets to zinc-coated plates and tubes. The fin sheets are clad with brazing filler in one process, the plates and tubes are coated with zinc in a second process and the brazing flux is applied in a third process.

An alternative method of preparing heat exchanger components for aluminum brazing is disclosed in U.S. Pat. No. 5,907,761. In the '761 patent, a solvent-based brazing composition is coated onto components using known techniques such as dip coating or liquid spray coating. The disclosed brazing composition includes, (1) a powdered alloy of aluminum, silicon, zinc, and indium (or beryllium), (2) a polymeric resin binder, (3) an aliphatic alcohol solvent, and (4) a brazing flux. In the patent, an alloy is first formed from powders of aluminum, silicon, zinc and indium. The alloy is then made into a powder and mixed with the polymer binder, solvent and flux. The resulting liquid brazing composition is then applied to the substrate using known techniques and becomes bound to the substrate by action of the polymer resin. Brazing follows.

SUMMARY OF THE INVENTION

By the process of the present invention, aluminum and other metal heat exchanger components are prepared for brazing using a new technique that replaces the multi-step operations of the prior art. The present invention provides a means to simultaneously clean and deoxidize heat exchanger components and bond all braze materials onto the components in a single operation. Individual zinc plating, filler cladding and separate flux application (for pre-cleaning, deoxidizing and braze flux deposition) can thereby be replaced. In addition, no solvent base or other liquid system is necessary.

The present invention generally applies a new technique for producing coatings known as kinetic spray or cold gas dynamic spray to brazing. This new technology has been reported in an article by T. H. Van Steenkiste et al., entitled "Kinetic Spray Coatings," published in Surface and Coatings Technology, vol. 111, pages 62–71, Jan. 10, 1999. The article discusses producing continuous layer coatings having low porosity, high adhesion, low oxide content and low thermal stress. The article describes coatings being produced by entraining metal powders in an accelerated air stream and projecting them against a target substrate. It was found that the particles that formed the coating did not melt or thermally soften prior to impingement onto the substrate.

The Van Steenkiste et al. work improved upon earlier work by Alkimov et al. as disclosed in U.S. Pat. No. 5,302,414, issued Apr. 12, 1994. Alkimov et al. disclosed an apparatus and process for producing dense layer coatings with powder particles having a particle size of from 1 to 50 microns using a supersonic spray operating at low temperatures and pressures.

The Van Steenkiste et al. article reported on work conducted by the National Center for Manufacturing Sciences (NCMS) to improve on the earlier Alkimov process and apparatus. Van Steenkiste et al. demonstrated that Alkimov's apparatus and process could be modified to produce kinetic sprayed continuous layer coatings using particle sizes of greater than 50 microns and up to about 106 microns. This modified process and apparatus for producing such larger particle size kinetic spray continuous layer coatings is disclosed in U.S. Pat. No. 6,139,913, Van Steenkiste et al., that issued on Oct. 31, 2000. The process and apparatus provide for heating a high pressure air flow up to about 650°

C. and accelerating it with entrained particles through a de Laval-type nozzle to an exit velocity of between about 300 m/s (meters per second) to about 1000 m/s. The thus accelerated particles are directed toward and impact upon a target substrate with sufficient kinetic energy to impinge the particles to the surface of the substrate. The temperatures and pressures used are sufficiently lower than that necessary to cause particle melting or thermal softening of the selected particle so that no phase transformation occurs in the particles prior to impingement.

The present invention provides a method for replacing, with a single process, the several processes currently used in brazing heat exchangers such as condensers, radiators, evaporators, and the like. The single spraying operation can generate a single layer or multiple layers of a monolith or composite coating.

The process of the invention involves kinetic spraying onto metal substrates a brazing composition that comprises corrosion protector, brazing filler and/or flux. In a preferred embodiment, the brazing composition comprises zinc or zinc-aluminum alloy as a corrosion protector, silicon or aluminum-silicon alloy as a brazing filler, and Nocolok® Flux or similar fluxing material as the flux. In another preferred embodiment, the brazing composition comprises a ternary alloy of aluminum-zinc-silicon powder and flux. In yet another preferred embodiment, the brazing composition comprises a pre-homogenized mechanical mixture of separate powders of aluminum, zinc, silicon and flux.

The process of the present invention may be used for brazing any metal surface and is not limited to use in heat exchangers. The advantage of the present invention is that it offers a simple yet versatile process for brazing metal surfaces.

The process provides an effective means for coating a brazing composition onto aluminum substrates that obviates the need for pre-fluxing, filler cladding and separate corrosion protector application. The process of the present invention may be used advantageously during any stage of processing including, for example, from immediately following tube extrusion to immediately prior to brazing.

Kinetic spray deposition is a relatively new technique where powders, especially of metal (or ceramic) particles, are accelerated in a pre-heated gas stream toward a substrate at high velocities between about 300 m/s (meters per second) to about 1000 m/s. Upon impact, the metal particles initially grit blast the surface and then plastically deform and impinge bond onto the surface. Subsequent particles bond with the deposited particles upon impact to form a surface layer coating.

Prior to the present invention, it was unexpected that kinetic spray could be suitably used to deposit braze compositions onto aluminum surfaces in a manner that would produce satisfactory braze joints. The process as used in the present invention applies the kinetic spray technology disclosed in U.S. Pat. No. 6,139,913, incorporated herein by reference, to the preparation of aluminum surfaces for brazing.

The process of the present invention is superior over known techniques. The kinetic sprayed powders in the braze composition never reach their melting temperature and always remain in their original solid phase during the spray process. Since the powders do not reach the molten state, little oxidation of the powders occur and a relatively oxide free coating can be formed. In addition, kinetic sprayed braze compositions offer the added advantage in that the aluminum components being coated need not be pre-fluxed (i.e., pre-cleaned and deoxidized) since the initial grit blasting action inherently cleans and de-oxidizes the surface as the brazing composition surface layer is being applied. Furthermore, while inert atmosphere processing is generally required for thermal spraying, as used in prior art processes to lessen the formation of oxidation during coating deposition, an inert atmosphere is not necessary in kinetic spray deposition, and the associated costs are thereby avoided.

A primary benefit of the present invention is the ability to mix different materials having different properties together and apply them as a composite coating. Because the powders are not melted in the kinetic spray process, the materials do not chemically combine or alloy in the kinetic spray process. The synergistic benefits of the various materials may, thereby, be taken advantage of in the most effective and efficient manner.

In development of the present invention, it was further discovered that kinetic spray is useful in coating alloys onto aluminum surfaces that have a substantially greater hardness than aluminum. It has now been found that ternary alloys such as zinc-aluminum-silicon alloys may be kinetic spray-coated onto aluminum substrates such as plate and tube surfaces. While specific materials are disclosed herein, it is clear from the versatility of the present invention that alloys of other braze materials may be similarly used.

Using the process of the present invention in aluminum brazing, any conceivable brazing composition may now be used as a single stage coating. Pre-fluxing and the use of a separate flux coating are no longer required. Instead, cleaning and deoxidizing are accomplished simultaneous to coating, and brazing flux may be incorporated into the coating itself. Accordingly, fluxless brazing is now possible. The present process also allows the incorporation of brazing filler into the coating so that cladding is no longer required. Accordingly, cladless brazing is now also possible. The brazing composition can comprise monoliths or composites of individual powders, alloy powders or their combinations to provide maximum versatility.

Cladless and fluxless brazing are now possible and a pre-coating of a corrosion protector is no longer necessary. The present invention provides the ability to incorporate corrosion protector, brazing filler and flux into a single coating composition and the means for coating that composition onto aluminum surfaces while simultaneously cleaning and deoxidizing the surface.

DESCRIPTION OF THE PREFERRED EMBODIMENT

Figure 1A:
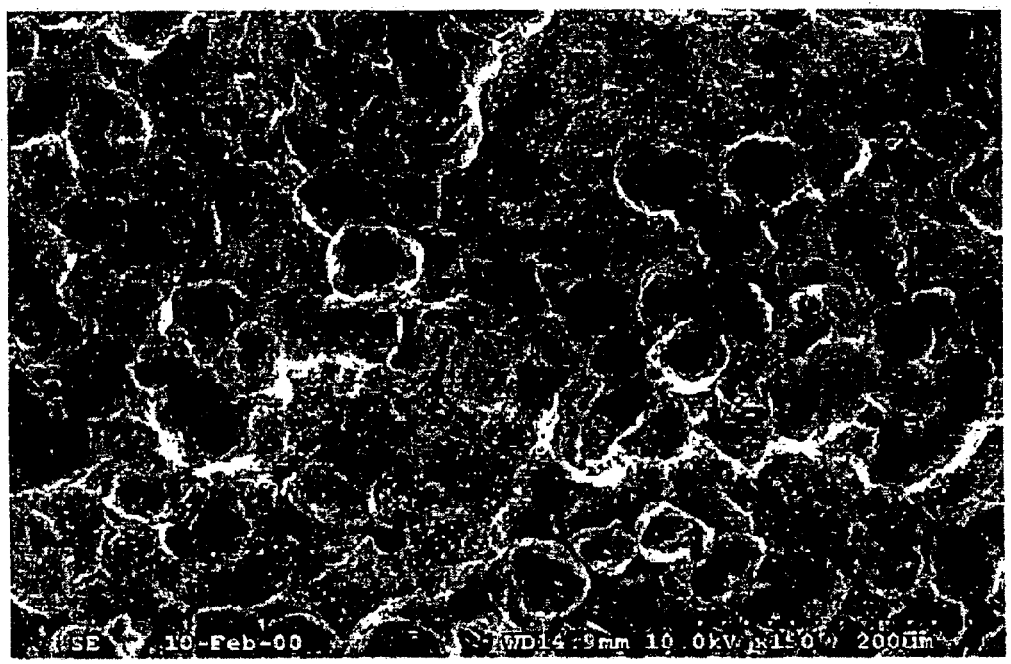
FIGS. 1A and 1B are SEM micrographs showing microstructures of two composite coatings of aluminum-silicon alloy and zinc of the present invention.

In the construction of a heat exchanger comprising fins and tubes, an extruded aluminum condenser tube is prepared for brazing aluminum fins thereon by kinetic spraying a brazing composition on the tube or other surface. The brazing composition is a solid phase monolith or composite that generally comprises particles of corrosion protector, filler material, and/or flux.

The brazing composition is selected from solid phase particles having a particle size (diameter or equivalent) distribution in the range of about 10 microns to about 150 microns, with a particle size distribution of greater than about 45 microns being preferred. The particles may further be either spherical or irregular shaped (such as granular). When the solid phase material is a monolith, it is preferred that the composition be selected from zinc, zinc-aluminum alloy, aluminum-silicon alloy, aluminum-zinc-silicon alloy and aluminum-zinc-silicon-copper alloy. When the solid phase material is a composite, it is preferred that the composition be selected from a combination of two or more of the following: zinc, zinc-aluminum alloy, aluminum, silicon, aluminum-silicon alloy, aluminum-zinc-silicon alloy and aluminum-zinc-silicon-copper alloy. It is preferred that a non-corrosive flux, such as Nocolok® flux or the like, be added to monolith or composite particles in preparing the brazing composition to be used.

The kinetic spray technique used in the present invention is primarily as disclosed in U.S. Pat. No. 6,139,913, the teachings of which are incorporated herein by reference.

In the present invention, the brazing composition is introduced into a focused gas stream traveling at a velocity of about 300 m/s (meters per second) to about 1000 m/s. The gas stream is preferably preheated to a temperature of from about 100° C. to about 300° C., and more preferably to about 200° C. As the particles of the brazing composition are entrained into the gas stream, they begin to gain kinetic and thermal energy. The brazing composition is then accelerated through a de Laval-type nozzle to achieve an exit velocity of up to about 1000 m/s directed toward the tube surface (i.e., the substrate being sprayed). The tube is moved across the path of the exit stream (or vice versa) to lay a coating on the surface of the tube. The tube is passed across the exit stream as necessary to create one or more layers.

As particles of the brazing composition impact the surface, kinetic energy is transferred to the aluminum surface. The impact of the particles initially grit blast the surface thereby fracturing any surface oxide layer, and simultaneously begin mechanically deforming and impingement bonding the particles to the surface. Successive layers are formed by the entrained particles impacting and bonding to other particles deposited on the surface. The particles deposited on the surface while undergoing plastic deformation remain in their original solid phase (i.e., they do not melt).

An aluminum substrate made according to the invention comprises an aluminum surface and a kinetically impinged coating bonded to its surface. The coating is a solid phase monolith or composite comprising one or more of corrosion protector for aluminum, filler material for brazing, and/or brazing flux. The coating may have multiple layers kinetically bonded directly to the aluminum surface. Each layer is substantially free of oxides and retains the physical properties and solid phase of the original pre-coating composition.

According to the present invention, the following coatings were prepared, kinetically sprayed onto aluminum brazing substrates and brazed. All showed good brazing results. While representative of the present invention, the following examples are not intended to limit the scope of the invention in any way.

EXAMPLES

Both monolith and composite coatings of various compositions were prepared including:

(a) zinc coatings with an average loading of about 50 g/sq.m. (grams per square meter) to about 400 g/sq.m.;

(b) zinc-aluminum alloy coatings with an average loading of about 100 g/sq.m. to about 600 g/sq.m. (having melting points of alloys lower that 600° C.);

(c) aluminum-silicon alloy coatings with an average loading of about 10 g/sq.m. to about 200 g/sq.m. with aluminum-silicon alloy starting powders having a composition of about 12% silicon by weight (i.e. the eutectic composition);

(d) aluminum-zinc-silicon ternary alloy coatings with starting powders having about 50% to about 78% aluminum, about 12% to about 45% zinc, and about 5% to about 10% silicon (all %'s by weight);

(e) aluminum-zinc-silicon-copper quaternary alloy coatings with average loading of about 20 g/sq.m. to about 150 g/sq.m. and with starting powders having about 50% to about 78% aluminum, about 10% to about 45% zinc, about 4% to about 10% silicon, about 0.1% to about 5% copper and trace amounts of other alloying elements such as iron, nickel, titanium and bismuth (all %'s by weight);

(f) composite coatings of aluminum and zinc, preferably with greater than about 40% by weight of zinc in the starting mixture;

(g) composite coatings of zinc and aluminum-silicon, preferably with about 6% to about 70% by weight of zinc in the starting mixture;

(h) composite coatings of aluminum, zinc and silicon with about 10% to about 20% silicon by weight in the starting powder, and preferably with about 15% silicon by weight; with the ratio of aluminum to zinc in the range of about 4 to about 0.6;

(i) coatings with starting powders as provided in (a), (b), (d), (e), (f), (g) and (h) with directly incorporated Nocolok® flux;

(j) coatings of (i) with a larger amount of Nocolok® flux incorporated as a metallized flux (in which the mixed powders of metals and flux were melted or sintered into ingots and then powdered and used as the kinetic sprayed composition).

Microstructural and chemical analyses of the above coatings were performed. Selected results are shown in FIGS. 1 through 5 that illustrate the general characteristics of these kinetic spray-deposited coatings.

Figure 1B:
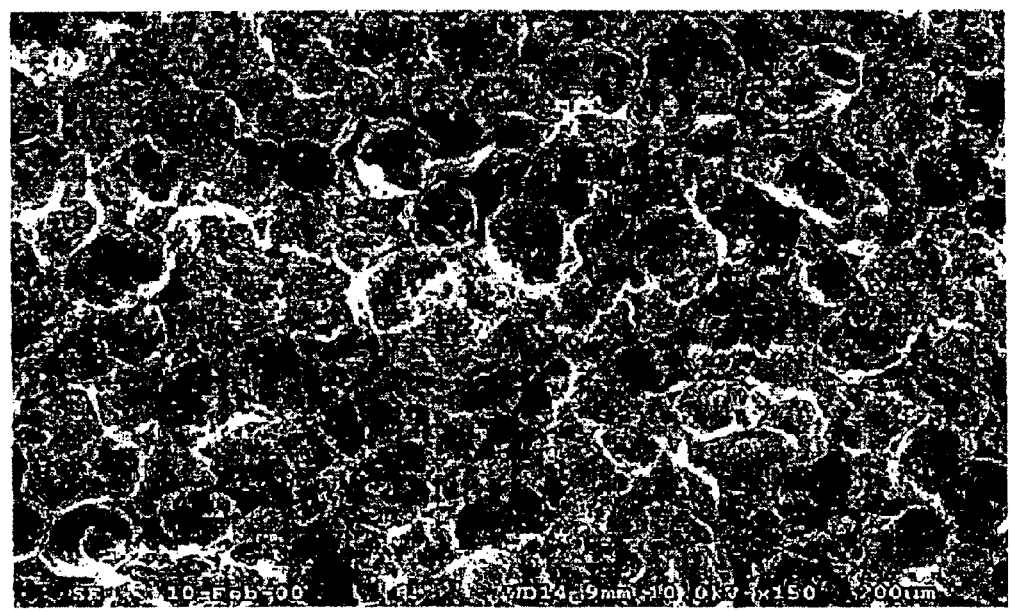
Figure 2A:
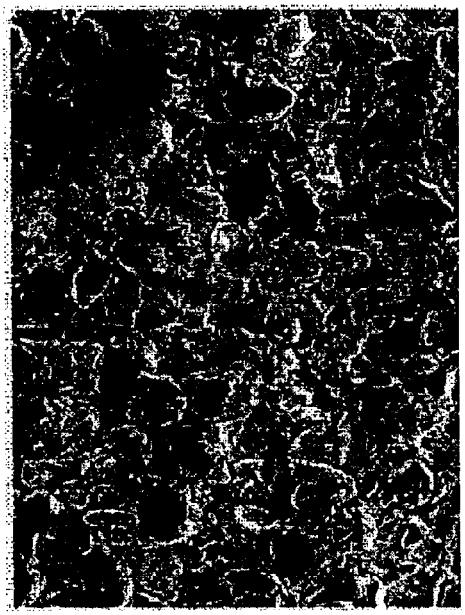
FIGS. 2A, 2B, 2C, and 2D are SEM images of composite coatings of aluminum and zinc of the present invention.
Figure 2B:
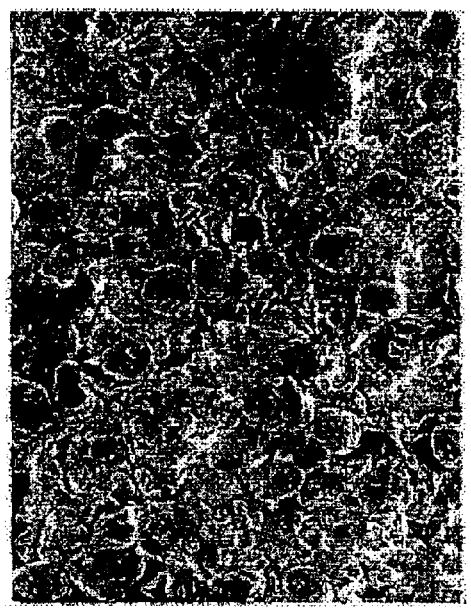
Figure 2C:
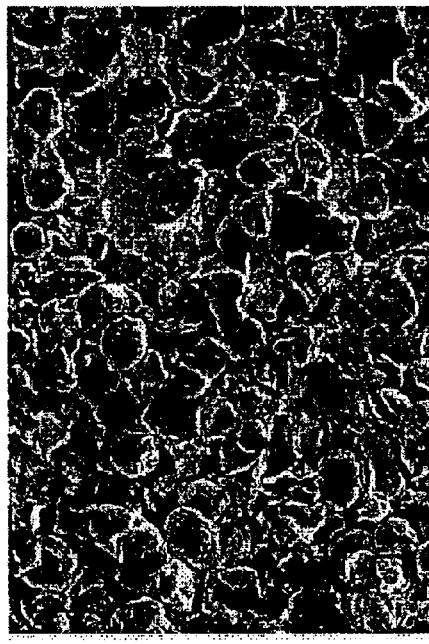
Figure 2D:
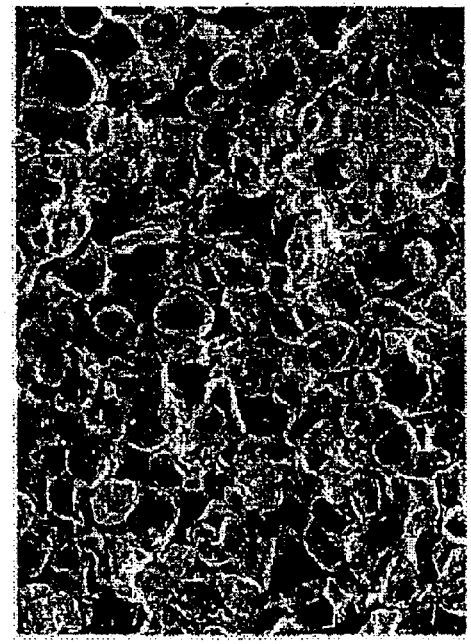
Figure 3A:
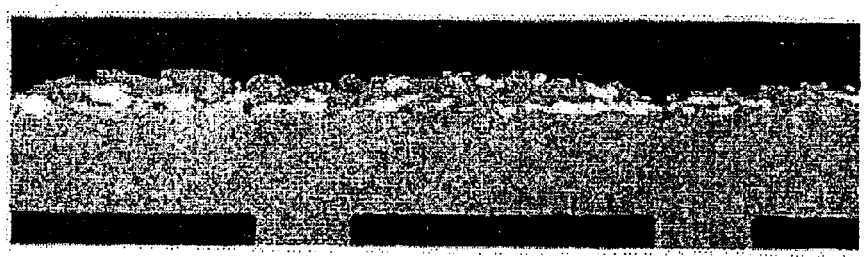
FIGS. 3A, 3B, 3C, and 3D are cross-sectional SEM images of the same coatings, respectively, as shown in FIG. 2.
Figure 3B:
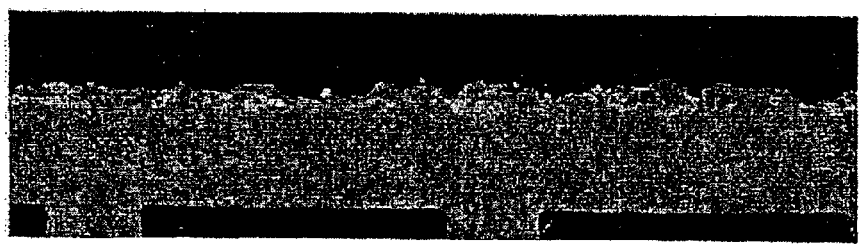
Figure 3C:
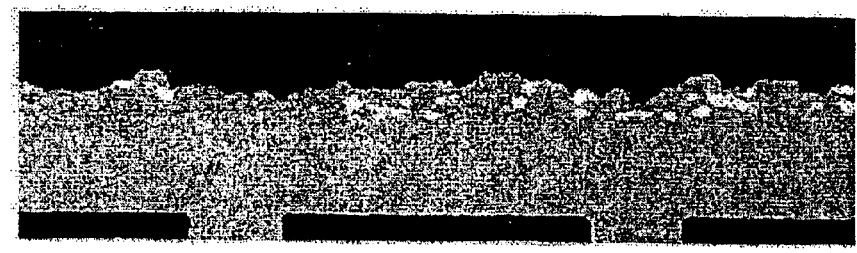
Figure 3D:
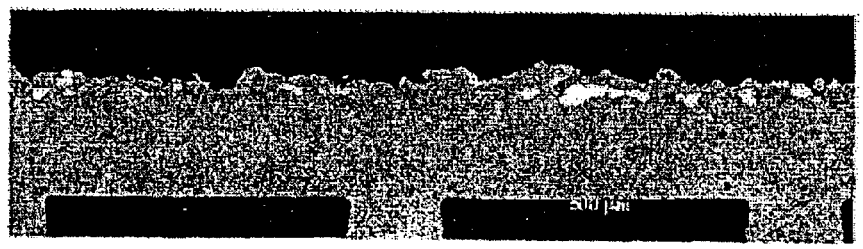

FIGS. 1A and 1B are plane-view SEM micrographs showing the microstructures of the aluminum-silicon alloy and zinc coatings as in (g), above, deposited from starting powders with 6% and 10% zinc, respectively. The spherical-shaped particles with darker contrast are the aluminum-silicon alloy and the remainder is zinc.

FIGS. 2A, 2B, 2C, and 2D show the plane view SEM images of the composite coatings of aluminum and zinc as in (c), above, which were deposited from two types of starting powders using two traverse speeds. Similar to FIG. 1, the spherical-shaped particles with darker contrast are the aluminum and the remainder is zinc.

FIGS. 3A, 3B, 3C, and 3D are the cross-sectional SEM images of the same coatings shown in FIG. 2. In these cross-sectional images, aluminum and zinc particles can be readily distinguished by their respective contrasts, with aluminum shown with the dark contrast and zinc shown with the bright contrast.

Figure 4A:
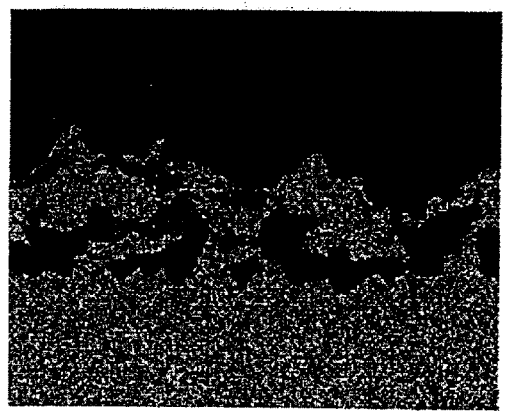
FIGS. 4A, 4B, 4C, and 4D are mappings of the elements of a composite coating of aluminum, zinc and silicon of the present invention.
Figure 4B:
Figure 4C:
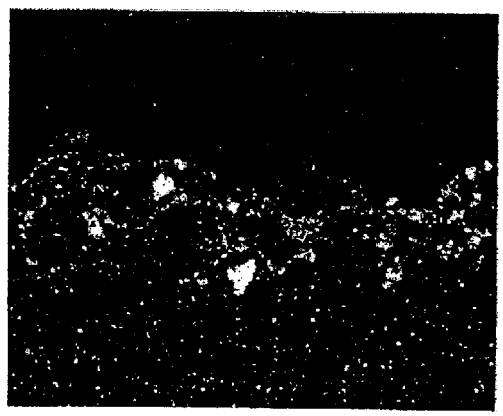
Figure 4D:
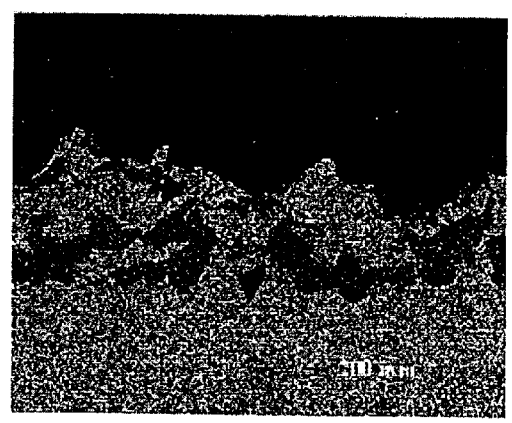
Figure 4:
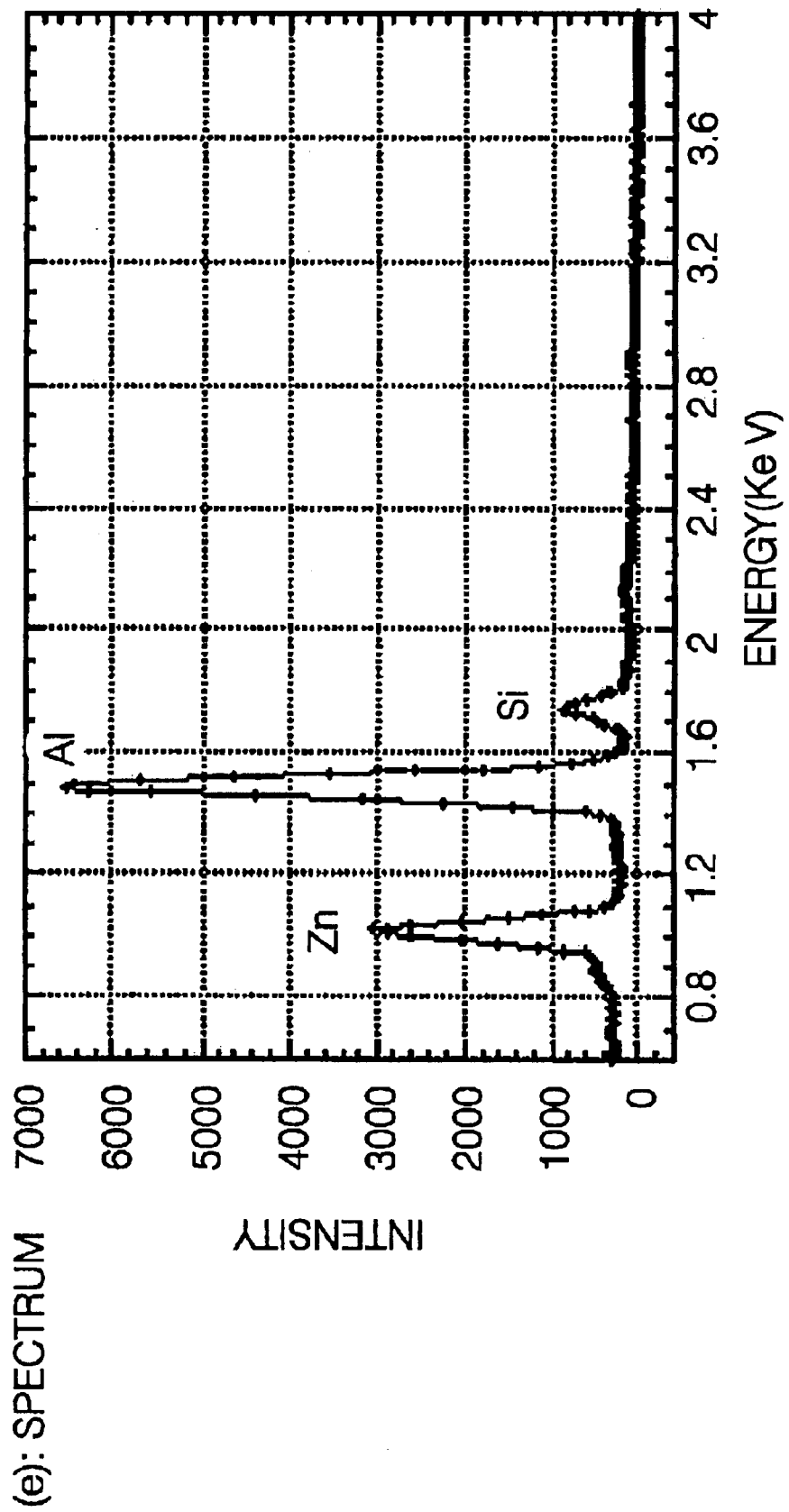
FIG. 4E is an energy dispersive spectrum of the composite coating.

FIGS. 4A–D present the cross-sectional elemental mappings of a composite coating of aluminum, zinc and silicon as in (h), above, showing mappings of aluminum (FIG. 4A), zinc (FIG. 4B), silicon (FIG. 4C); and FIG. 4D shows an overlay of FIGS. A–C. These mappings and the energy dispersive spectrum in FIG. 4E indicate the incorporation of silicon in the coating. Silicon is a rapid diffuser in aluminum and can effectively promote the melting of aluminum at the brazing temperature.

Figure 5A:
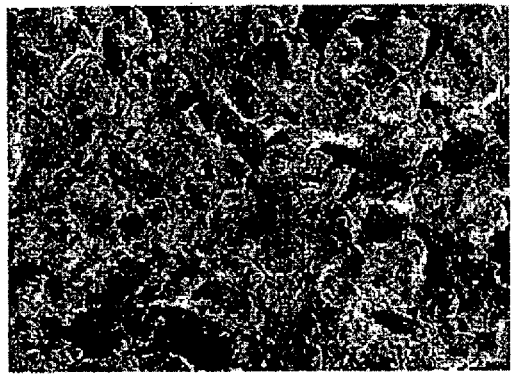
FIGS. 5A, 5B, 5C, 5D and 5E are mappings of various elements of zinc and aluminum-silicon alloy coating with directly incorporated Nocolok® flux as in the present invention.
Figure 5B:
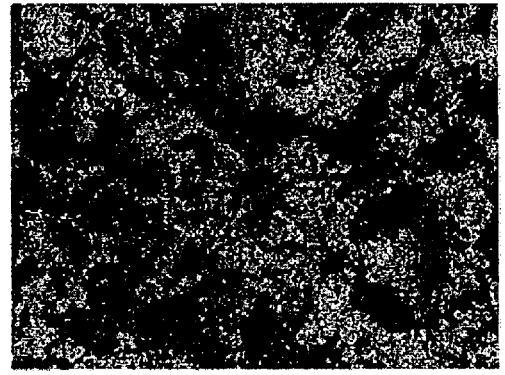
Figure 5C:
Figure 5D:
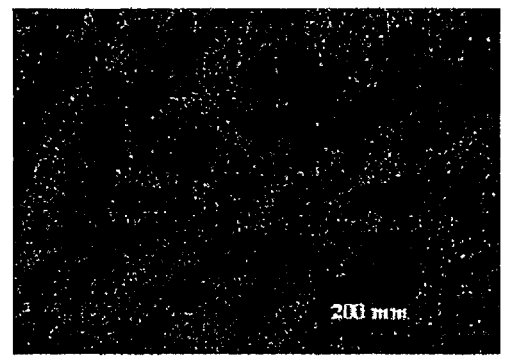
Figure 5E:
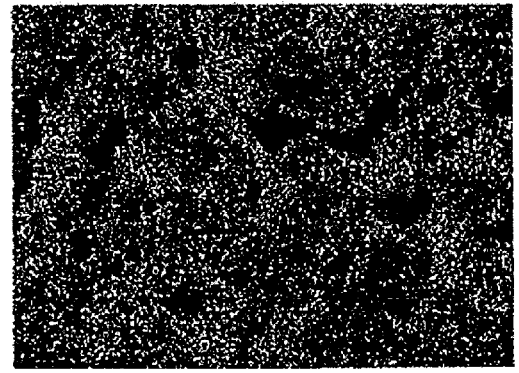
Figure 5:
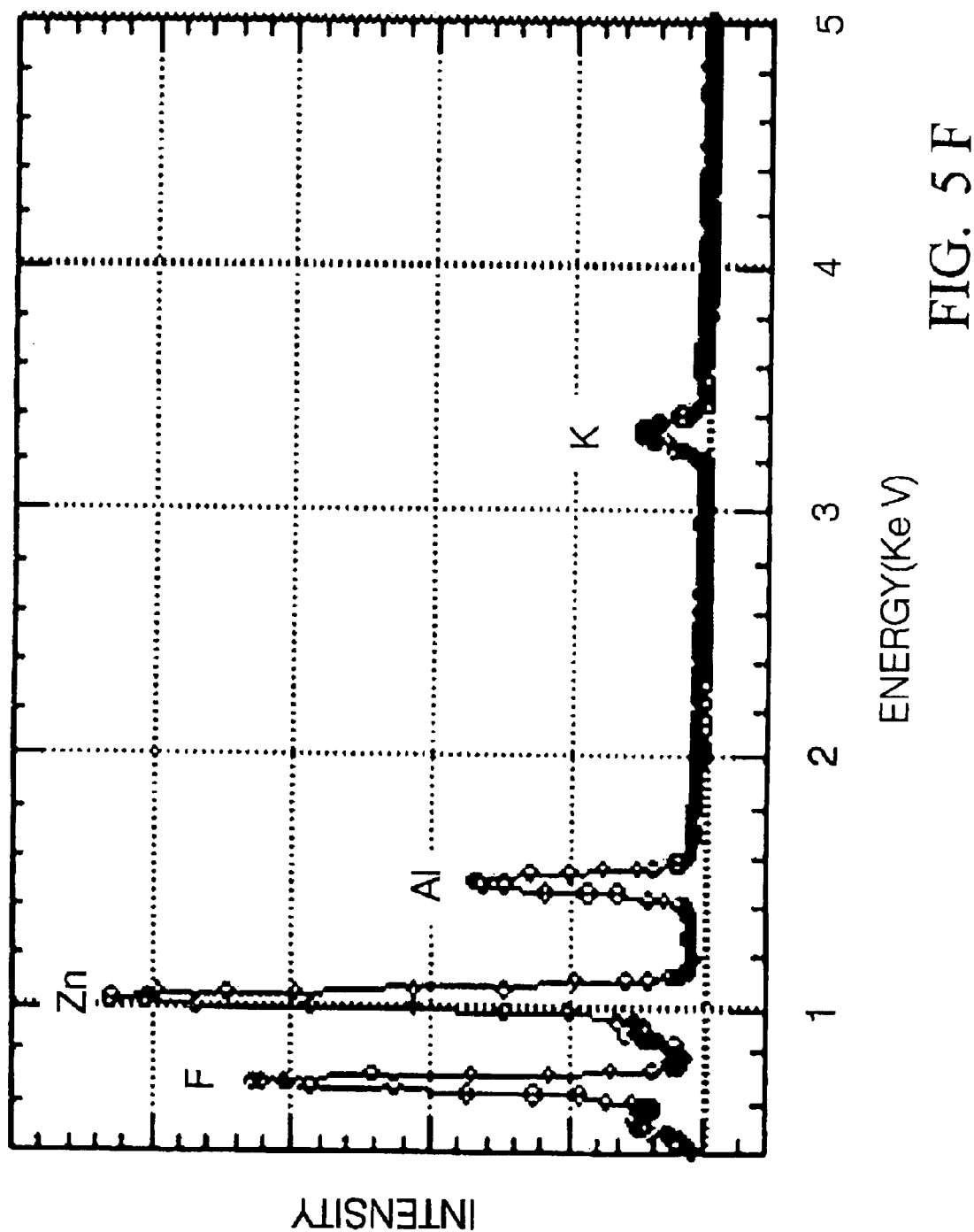
FIG. 5F is the energy dispersive spectrum of the alloy coating.

FIG. 5A is a SEM image of a zinc and aluminum-silicon alloy coating with directly incorporated Nocolok® flux as in (i) combined with (g), above; and FIGS. 5B–E are elemental mappings of zinc (FIG. 5B), silicon (FIG. 5C), fluorine (FIG. 5D) and potassium (FIG. 5E). The starting powder used for this coating contains about 6% by weight flux and about 94% of a mixture of zinc and aluminum-silicon alloy. Both elements F (fluorine) and K (potassium), which are chemical constituents of Nocolok® Flux (that has a general chemical formula of KAlF), displayed strong peaks in the energy dispersive spectrum of FIG. 5F. This shows that a significant amount of flux was incorporated into the coating via the kinetic spray process. Moreover, the relatively uniform distribution of K and F presented by the elemental mappings of FIGS. 5A–E indicates that the flux was uniformly distributed.

Figure 6A:
FIGS. 6A and 6B are elemental mappings of a fin-tube assembly brazed with aluminum-zinc-silicon alloys according to the present invention.
Figure 6B:
Figure 6C:
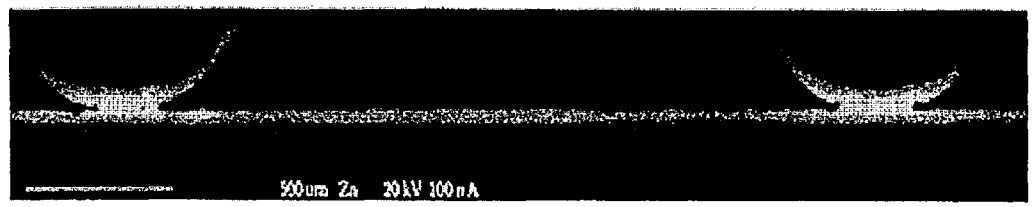
FIG. 6C depicts a mapping of an assembly brazed with an alloy according to the prior art.

FIGS. 6A, 6B and 6C are zinc elemental mappings of brazed fin-tube assemblies: FIGS. 6A and 6B show alloy assemblies prepared according to the present invention, while FIG. 6C shows an alloy prepared according to the prior art. As shown, the mappings of FIGS. 6A and 6B compare well with FIG. 6C demonstrating uniform zinc distribution in the surface layer (as a corrosion protector) for the assemblies in FIGS. 6A and 6B.

The brazability of the coatings, using known processes, was examined using small assemblies of cladless fin stock and extruded aluminum tubes with the kinetic sprayed coatings. Brazing was conducted at a brazing temperature of about 600° C. for about 5 to about 15 minutes under about 1 atmosphere of nitrogen. The brazing properties of the coatings were evaluated by cross-sectional SEM examination of the brazed joints. Pull tests were also performed to demonstrate the critical load needed to pull off a fin from the aluminum tube. The results are summarized as follows.

Figure 7A:
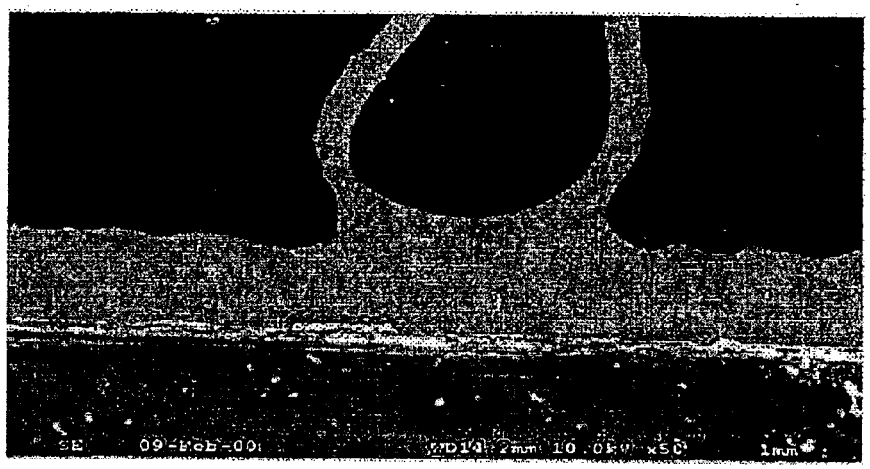
FIGS. 7A and 7B are SEM micrographs of the brazing results for zinc and aluminum-silicon alloy coatings of the present invention.
Figure 7B:
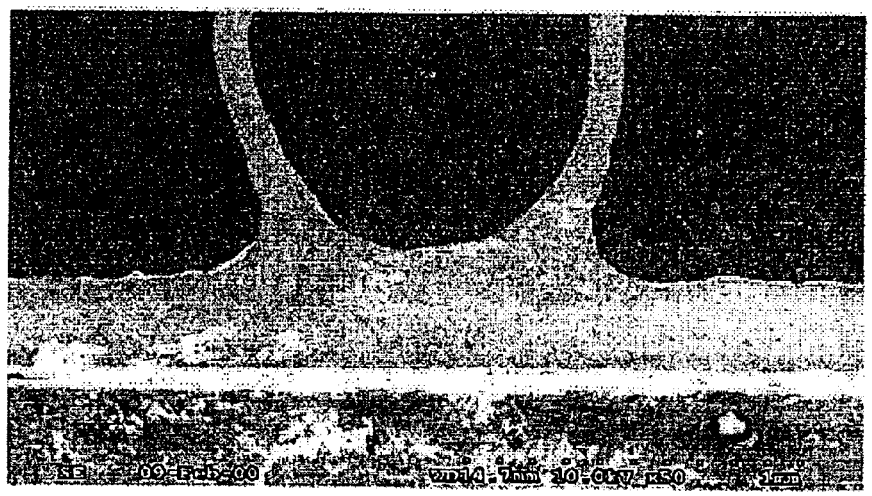

Composite coatings of zinc and aluminum-silicon alloy: These coatings generally exhibited good brazability under pre-fluxing conditions. The flux was applied prior to brazing experiments by either dipping or spraying the small assemblies with an alcohol or a water solution having a flux concentration of from about 5% to about 20%. FIGS. 7A and 7B provide SEM micrographs of the brazing results for 15% and 20% by weight zinc, respectively. As shown, very homogeneous and well-shaped brazing joints were formed. Pull tests were also conducted on the brazed joints as shown in table 1 below. Brazed components of the present invention compared well with commercially available products known in the art (having a threshold of about 10.2±1.2 kg). The results further showed that there was no significant dependence of brazing results based upon variations in the tested compositions or the average coating thickness (i.e. the loading of a coating).

TABLE 1

Brazing properties of small fin and tube assemblies using kinetic spray deposited composite coatings of zinc and aluminum-silicon alloy

| | Brazing Conditions | | | Results of Brazing | | |
|---|---|---|---|---|---|---|
| | | | | Pre-fluxed | | |
| Starting Powders | Temp (° C.) | Time (Min) | N$_2$ (atm) | Brazing Result | Pull Tests | Not-fluxed Brazing Result |
| 6% Zn + 94% Al—Si | 600° C. | 10 | 1 | Good | 12.8 ± 0.9 kg Failed at Fin/Joint | BWH |
| 10% Zn + 90% Al—Si | 600° C. | 10 | 1 | Good | 13.8 ± 1.0 kg Failed at Fin/Joint | BWH |
| 15% Zn + 85% Al—Si | 600° C. | 10 | 1 | Good | 10.9 ± 0.8 kg Failed at Fin/Joint | BWH |

TABLE 1-continued

Brazing properties of small fin and tube assemblies
using kinetic spray deposited composite coatings of
zinc and aluminum-silicon alloy

| | Brazing Conditions | | | Results of Brazing | | |
|---|---|---|---|---|---|---|
| | | | | Pre-fluxed | | |
| Starting Powders | Temp (° C.) | Time (Min) | N₂ (atm) | Brazing Result | Pull Tests | Not-fluxed Brazing Result |
| 20% Zn + 80% Al—Si | 600° C. | 10 | 1 | Good | 11.4 ± 1.1 kg Failed at Fin | BWH |

BWH: breakable with hands
For the standard product, failures under the pull test occur at 10.2 ± 1.2 kg. and breakage predominantly takes place at braze joint.

Figure 8:
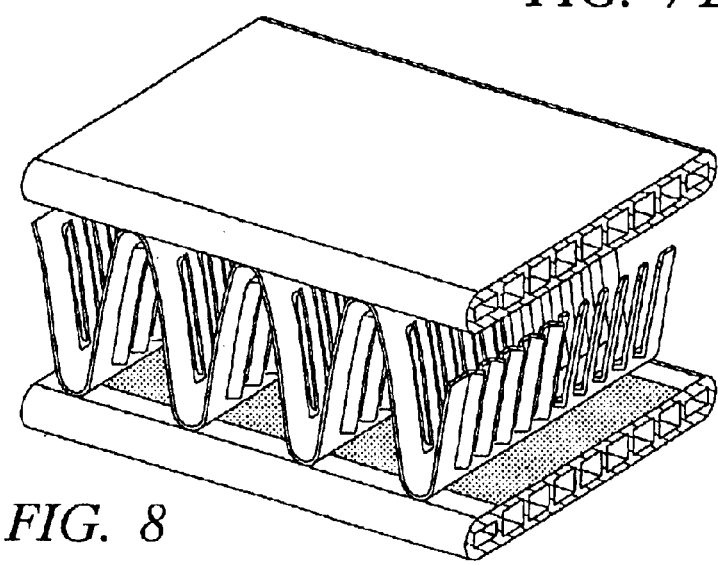
FIG. 8 depicts a small assembly of tubes brazed to aluminum fin material using a composite coating of aluminum and zinc of the present invention.
Figure 9A:
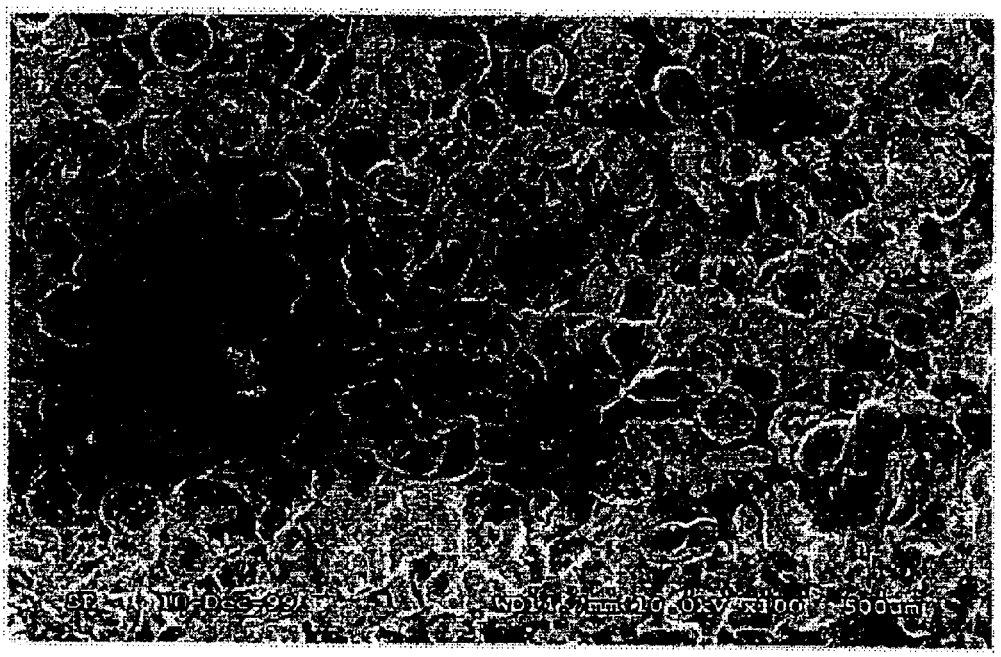
FIGS. 9A and 9B are SEM micrographs showing the surface morphology of a tube as in FIG. 8 before and after brazing, respectively.
Figure 9B:
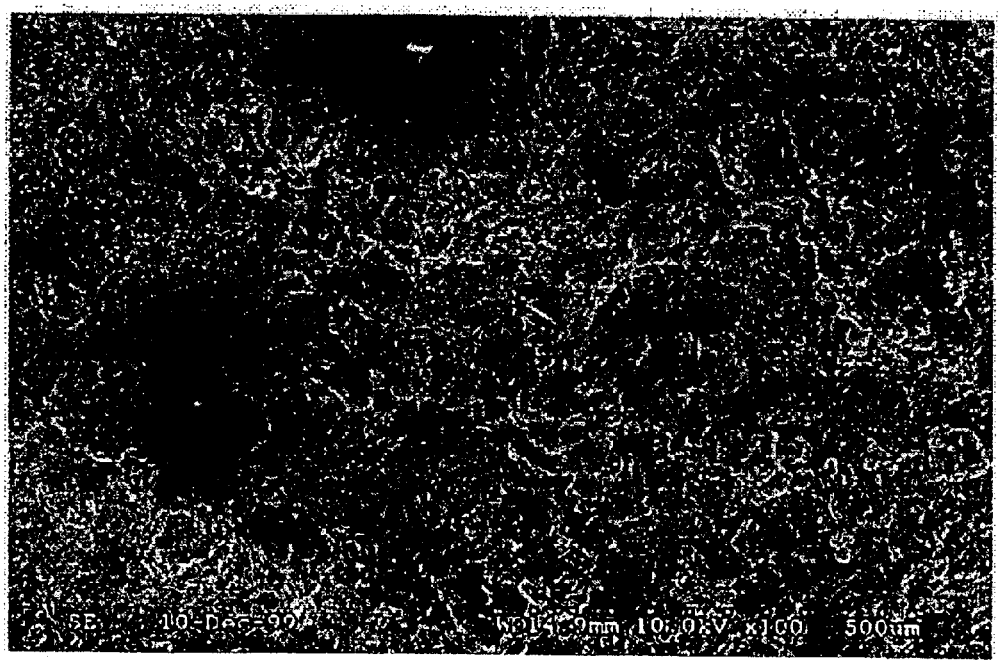

Composite coatings of aluminum and zinc: Without using flux, good brazing results were achieved for high zinc-content coatings. FIG. 8 depicts a small assembly of tubes brazed to aluminum fin material using a high zinc-content aluminum/zinc coating according to the process of the present invention. The assembly was brazed at 600° C. for 8 minutes in a nitrogen atmosphere without flux. Scanning electron micrographs show the difference in the surface morphology of the tube before brazing (FIG. 9A) and after brazing (FIG. 9B), showing that the braze composition coating on the tube surface melted as necessary to form a joint. The brazing results for selected aluminum and zinc coatings are summarized in Table 2. While brazability was better for pre-fluxed substrates, brazing without pre-fluxing was demonstrated.

helps the melting of aluminum during the brazing process. As a result, good brazability was achieved for the tri-powder coatings with a large variation in the aluminum to zinc ratios.

Composite coatings of zinc and aluminum-silicon alloy with directly incorporated flux: Good brazability was found using flux-incorporated coatings without pre-fluxing the test assembly.

For both composite coatings of aluminum and zinc, and composite coatings of aluminum alloy and zinc, zinc was incorporated into the coatings primarily to promote coating formation as a binder and to enhance corrosion resistance. Because of the volatile nature of zinc, some loss of zinc during the brazing process is expected, while a major loss of zinc would be of concern. Elemental mapping was per-

TABLE 2

Brazing conditions and results using the composite
aluminum and zinc coatings

| | | | | Brazing Results | | | |
|---|---|---|---|---|---|---|---|
| Brazing Conditions | | | | Starting Powder A Al (40%) + Zn (60%) | | Starting Powder B Al (60%) + Zn (40%) | |
| Flux | N₂ (atm) | Temp (° C.) | Time (min) | Brazability | Pull Test Load/Failure | Brazability | Pull Test |
| No | 1 | 600 | 5 | Not Brazed | | Not Brazed | |
| | 1 | 600 | 10 | Brazed (UBWH) | 2.7 kg Joint only | Not Brazed | |
| | 1 | 600 | 15 | Brazed (UBWH) | | Brazed (BWH) | |
| Yes | 1 | 600 | 5 | Brazed (UBWH) | 8.2 ± 3.8 kg Joint only | Brazed (UBWH) | 9.4 ± 4.1 kg Joint only |
| | 1 | 600 | 10 | Brazed (UBWH) | 10.7 ± 1.0 kg Joint only | Brazed (UBWH) | 10.7 ± 1.8 kg Joint only |
| | 1 | 600 | 15 | Brazed (UBWH) | 8.1 ± 2.2 kg Joint only | Brazed (UBWH) | 10.1 ± 2.1 kg Joint only |

UBWH: unbreakable with hands;
BWH: Breakable with hands

Figure 10A:
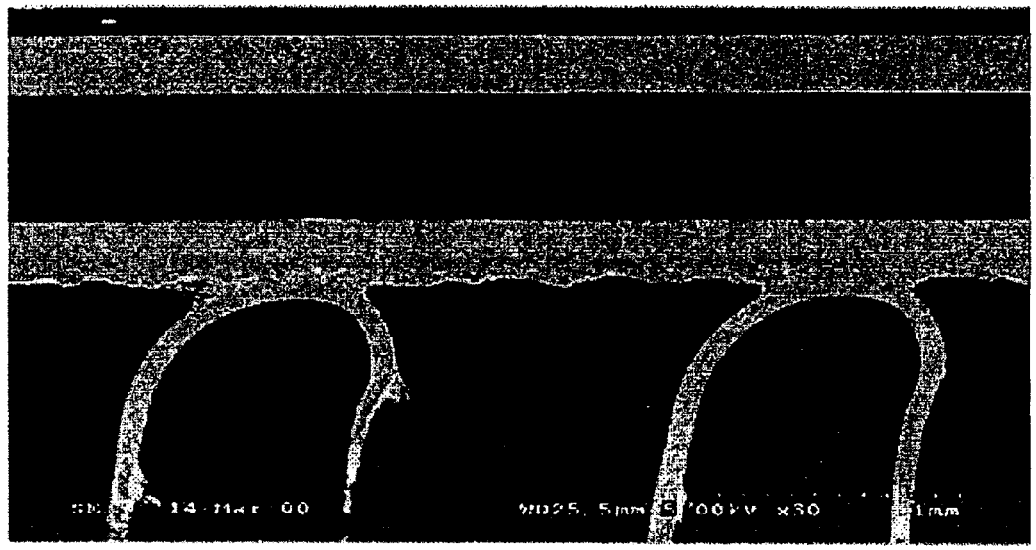
FIGS. 10A and 10B are examples of the joints brazed according to the present invention using an aluminum-rich coating and a zinc-rich coating, respectively (both are composite coatings of aluminum and zinc).
Figure 10B:
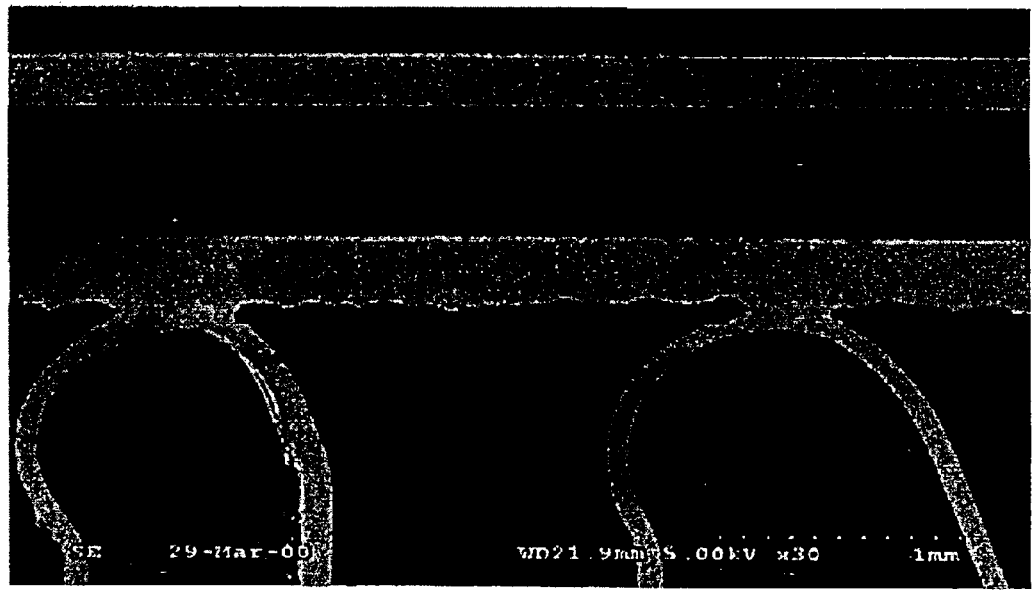
Figure 11:
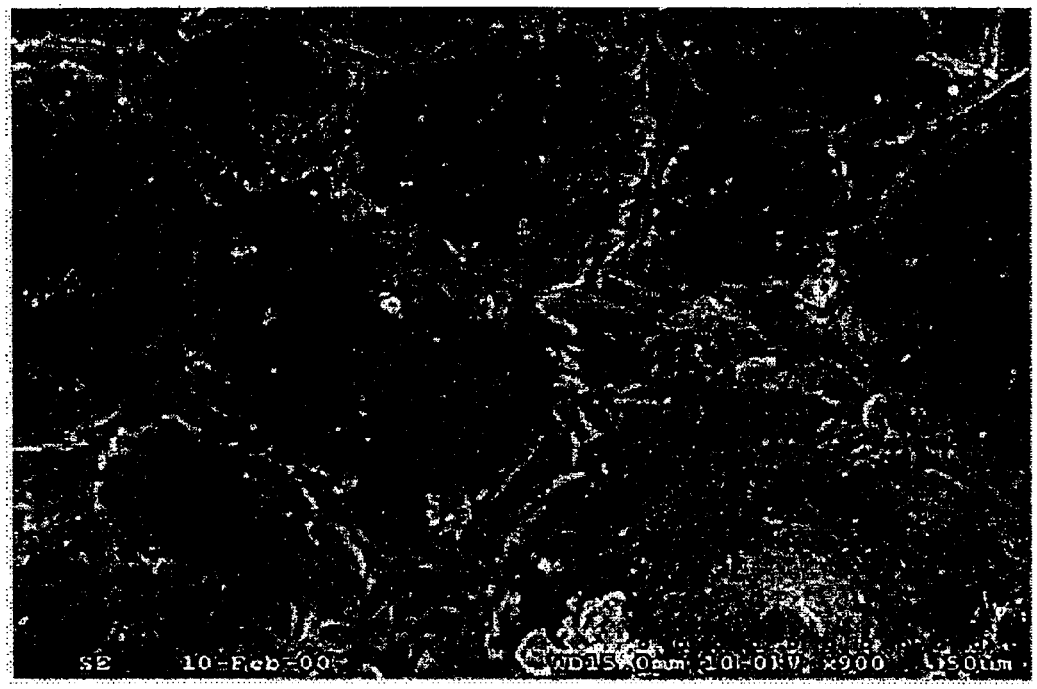
FIGS. 11A and 11B are elemental mapping results showing that zinc deposited on aluminum tubes according to the present invention is uniformly distributed on the surface after brazing.
Figure 11:
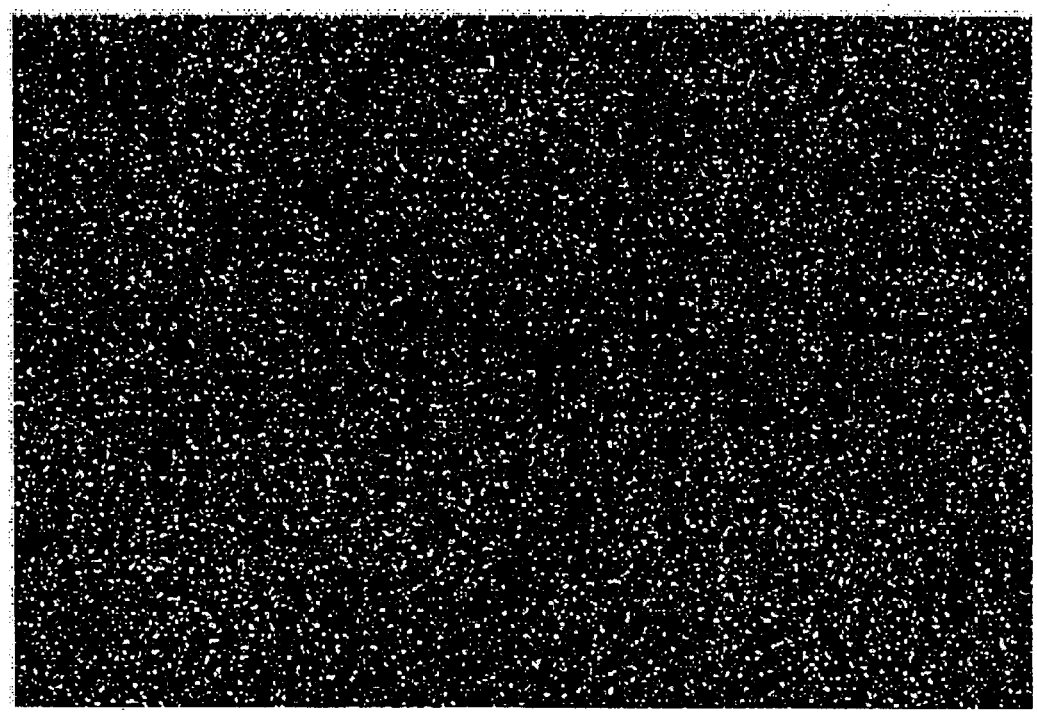

Composite coatings of aluminum zinc and silicon (i.e., the tri-powder coating): Coatings were tested with compositions having about 34% to about 68% aluminum, about 17% to about 51% zinc, and about 15% silicon (all by weight) with loadings of about 75 g/sq.m. (grams per square meter) to about 375 g/sq.m. All of the coatings generally showed very good brazing properties. FIGS. 10A and 10B show examples of the brazing joints produced using an aluminum-rich coating and a zinc-rich coating, respectively. Since silicon is a rapid diffuser in aluminum, the incorporation of silicon formed on selected specimens. The results indicate that substantially larger amounts of zinc remained on the surface of tubes than expected. FIGS. 11A and 11B show an example of elemental mapping results, indicating that zinc uniformly distributed on the surface of aluminum tubes.

Figure 12:
FIGS. 12A and 12B are elemental mappings of aluminum-zinc-silicon alloy coatings showing brazed fin and tube assemblies of the present invention.
Figure 12:

Coatings of aluminum-zinc-silicon alloy: The coatings exhibited superior brazing properties. With alloy coatings, it was found that a continuous layer coating was not required to achieve satisfactory brazing results. It was also found, as shown in FIGS. 12A and 12B that the zinc was uniformly distributed in the coating, which is more desirable for corrosion protection. The results of a SWAAT test (a standard corrosion test for condensers) indicates that the assemblies brazed with aluminum-zinc-silicon alloys can have the corrosion performance equivalent to or better than a product produced using the prior art.

While the preferred embodiment of the present invention has been described so as to enable one skilled in the art to practice the process of preparing aluminum surfaces for brazing, it is to be understood that variations and modifications may be employed without departing from the concept and intent of the present invention as defined by the following claims. The preceding description is intended to be exemplary and should not be used to limit the scope of the invention. The scope of the invention should be determined only by reference to the following claims.

What is claimed is:

1. A process for forming a brazing composition and bonding it to an aluminum surface comprising:
    a. selecting a brazing composition comprising particles of a monolith of zinc-aluminum alloy, aluminum-silicon alloy, aluminum-zinc-silicon alloy or aluminum-zinc-silicon-copper alloy or a composite selected from a combination of at least two of the following: zinc, zinc-aluminum alloy, aluminum, silicon, aluminum-silicon alloy, aluminum-zinc-silicon alloy, and aluminum-zinc-silicon-copper alloy;
    b. introducing said brazing composition into a focused gas stream;
    c. entraining said brazing composition in said gas stream;
    d. accelerating said brazing composition in said gas stream toward an aluminum surface;
    e. impacting said brazing composition onto said aluminum surface thereby kinetically bonding said brazing composition to said aluminum surface, said brazing composition remaining in its original solid phase upon bonding to said aluminum surface.

2. The process of claim 1, wherein said particles of said brazing composition are accelerated in said gas stream to a velocity of about 300 to about 1000 meters per second.

3. The process of claim 1, further comprising pre-heating said gas stream to a temperature of about 300° C.

4. The process of claim 1 further comprising in step a. the step of adding to said brazing composition particles of a brazing flux.

5. The process of claim 4 comprising adding particles of a brazing flux comprising potassium fluoroaluminate salts.

6. A brazable aluminum substrate comprising an aluminum surface and a kinetically impinged coating bonded thereon, wherein said coating is a solid phase monolith of zinc-aluminum alloy, aluminum-silicon alloy, aluminum-zinc-silicon alloy or aluminum-zinc-silicon-copper alloy or a composite selected from a combination of at least two of the following: zinc, zinc-aluminum alloy, aluminum, silicon, aluminum-silicon alloy, aluminum-zinc-silicon alloy, and aluminum-zinc-silicon-copper alloy; said coating kinetically bonded to said aluminum surface and being substantially free of oxidation within said coating, and which substantially retains the same physical properties and solid phase as the coating prior to bonding.

7. The brazable aluminum substrate of claim 6 wherein said coating further comprises brazing flux.

8. The brazable aluminum substrate of claim 7 wherein said flux comprises potassium fluoroaluminate salts.

9. A method of forming a brazing surface comprising:
    providing a metal surface;
    providing a brazing composition comprising at least two of a corrosion protector material, a brazing filler material, and a flux material; and
    kinetically spraying said brazing composition onto said metal surface, thereby kinetically bonding said brazing composition to said metal surface.

10. The method of claim 9, comprising providing aluminum as said metal surface.

11. A process for forming a brazing composition and bonding it to a surface comprising:
    a. selecting a brazing composition comprising particles of a monolith of zinc-aluminum alloy, aluminum-silicon alloy, aluminum-zinc-silicon alloy or aluminum-zinc-silicon-copper alloy or a composite selected from a combination of at least two of the following: zinc, zinc-aluminum alloy, aluminum, silicon, aluminum-silicon alloy, aluminum-zinc-silicon alloy, and aluminum-zinc-silicon-copper alloy;
    b. introducing said brazing composition into a focused gas stream;
    c. entraining said brazing composition in said gas stream;
    d. accelerating said brazing composition in said gas stream toward said surface;
    e. impacting said brazing composition onto said surface thereby kinetically bonding said brazing composition to said surface, said brazing composition remaining in its original solid phase on said surface.

12. A brazable substrate comprising a metal surface and a kinetically impinged coating bonded thereon, wherein said coating is a solid phase monolith of zinc-aluminum alloy, aluminum-silicon alloy, aluminum-zinc-silicon alloy or aluminum-zinc-silicon-copper alloy or a composite selected from a combination of at least two of the following: zinc, zinc-aluminum alloy, aluminum, silicon, aluminum-silicon alloy, aluminum-zinc-silicon alloy, and aluminum-zinc-silicon-copper alloy; said coating kinetically bonded to said metal surface and being substantially free of oxidation within said coating, and which substantially retains the same physical properties and solid phase as the coating prior to its bonding.

13. A process for forming a brazing composition and bonding it to a metal surface comprising:
    a. selecting a brazing composition comprising particles of a solid phase monolith of zinc-aluminum alloy, aluminum-silicon alloy, aluminum-zinc-silicon alloy or aluminum-zinc-silicon-copper alloy or a composite selected from a combination of at least two of the following: zinc, zinc-aluminum alloy, aluminum, silicon, aluminum-silicon alloy, aluminum-zinc-silicon alloy, and aluminum-zinc-silicon-copper alloy;
    b. introducing said brazing composition into a focused gas stream pre-heated to a temperature sufficiently low to maintain said particles in their original solid phase;
    c. entraining said brazing composition in said gas stream;
    d. accelerating said brazing composition in said gas stream toward said metal surface;
    e. impacting said brazing composition onto said metal surface thereby kinetically bonding said brazing composition to said metal surface, said brazing composition remaining in its original solid phase upon bonding to said metal surface.

* * * * *